United States Patent Office 3,449,754
Patented June 10, 1969

3,449,754
GRAPHICAL PLOTTER
Theo Stutz, Zollikerberg, Zurich, Switzerland, assignor to Contraves AG, Zurich, Switzerland
Filed May 29, 1967, Ser. No. 642,247
Claims priority, application Switzerland, May 31, 1966, 7,869/66
Int. Cl. G01d 9/26
U.S. Cl. 346—29      13 Claims

ABSTRACT OF THE DISCLOSURE

A graphical plotter having a movable carriage supporting a movable recording member. The carriage is movable along a set of orthogonal axes in the plane of the plotting surface of the plotter. The recording member is movable along a second set of orthogonal axes, with respect to the carriage member. The recording member and second set of orthogonal axes are mounted onto the carriage member. The absolute motion of the recording member is thus the sum of the motions of the carriage member and the motion of the recording member relative to the carriage member. Servo motors are provided for driving the carriage member as well as the recording member in relation to the carriage member. The carriage is a relatively slow moving member, but travels over a substantially long distance. The relative motion of the recording member with respect to the carriage, on the other hand, is a relatively rapid responsive motion over a considerably shorter range of distance than that travelled by the carriage.

Background of the invention

A graphical plotter, in accordance with the present invention, serves the useful function of plotting a given graph with increased speed and greater accuracy.

In order to carry out this function, the recording member must be able to execute considerably larger accelerations. Furthermore, since the recording member is to maintain a predetermined accuracy over a relatively large distance such as, for example, 150 to 250 cm., the recording member must be mounted on a carriage. The latter is movable along a cross rod which, in turn, is movable along a guide rod so as to provide motion along a set of coordinate axes. If this simplified plotter arrangement is to be applied, the movable parts cannot be driven by means of relatively small servo controls using low control power. In order to apply the relatively large accelerations required, it is essential that relatively large motors with correspondingly large torques be applied. This feature, however, results in the requirement of heavier apparatus constructions.

The intermediate recording speed, for a given acceleration, is proportional to the geometric center of the acceleration and line length. An increase in acceleration is therefore especially useful for recording lines of short length. In accordance with the present invention, the rapid recording or plotting of short lines may be accomplished without moving the carriage on the cross rod. Thus, the present invention provides for an auxiliary motion of the recording member, relative to the carriage. This auxiliary motion is of limited amplitude, but capable of essentially higher accelerations.

The masses of the driving mechanisms which move the recording member relative to the carriage, are maintained relatively small in the present invention. Accordingly, the relative motion of the recording member with respect to the carriage may be executed with greater accelerations and less driving torques.

Summary of the invention

The graphical plotter is equipped with a recording or plotting member which is movable along the designated plotting surface. The recording member is mounted onto a carriage member which moves the recording member along a set of predetermined coordinate axes. The carriage member is supported by a stationary reference member so that it may freely move within the confinements of the plotting surface. The carriage is mounted onto a cross rod which, in turn, is movable along a guide rod situated perpendicular to the cross rod. In this manner, the carriage is movable along a set of rectangular coordinate axes. The carriage is provided with an auxiliary driving mechanism which allows the recording member to be movable relative to the carriage member. The arrangement is such that the recording member is movable along an independent set of rectangular coordinate axes, relative to the carriage member. When directing the recording member to a desired position, the carriage member moves over a substantially long distance but with relatively slow motion. The recording member on the other hand moves over a relatively short distance with respect to the carriage member, but this relative motion of the recording member is substantially more rapid than the motion of the carriage member. Thus, the carriage may be considered as a coarse positioning member, whereas the recording member, when executing its relative motion, may be considered as the fine positioning member. The arrangement, in accordance with the present invention, permits rapid plotting or tracing of the desired graph with considerably more accuracy than that available from conventional plotters.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing.

Description of the preferred embodiments

Figure 1:
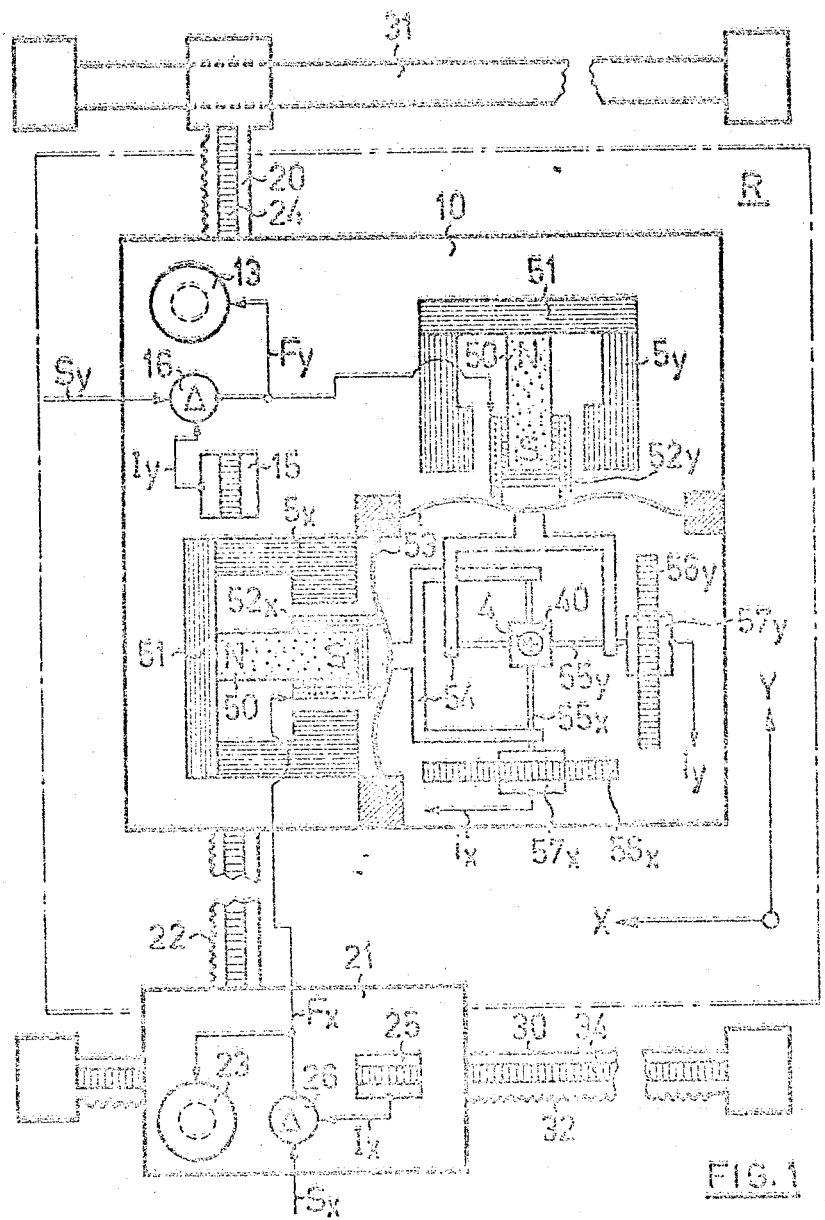
FIG. 1 is a functional schematic diagram of the graphical plotter and shows the mechanism whereby the carriage member of the plotter is moved along the plotting surface, and the recording member is moved relative to the carriage member.

In accordance with FIG. 1, a carriage 10 is movable along the Y direction due to the cross rod 20. The latter is, at the same time, movable along the X direction or X axis, by means of two parallel and stationary guide rods 30 and 31.

For purposes of simplicity, it is assumed that the cross rod 20 and the guide rod 30 is provided with gear racks 22 and 32, respectively. Linked to the gear racks are two driving servo motors 13 and 23, respectively. The servo motors are secured to the carriage 10 and to the cross member 21. The cross rod 20 and guide rod 30 are also provided with scales 24 and 34 respectively. These scales operate in conjunction with indicators 15 and 25 mounted on the carriage 10 and cross member 21, respectively. These indicators serve to indicate the instantaneous position of the carriage in the Y and X directions with respect to a given reference point or origin. Numerous transducers are commercially available for converting the Y and X coordinates or position of the carriage into corresponding electrical signals.

Error sensing devices 16 and 26 are mounted on a carriage 10 and cross member 21, respectively. The given input positions $S_y$ and $S_x$ are applied to the sensing devices 16 and 26, in the form of electrical signals. The error sensing devices compute the differences between the given inputs $S_y$ and $S_x$, and the actual instantaneous position of the carriage, $I_y$ and $I_x$. Thus, the sensing device 16 computes the error $F_y = S_y - I_y$. The sensing device 26, on the other hand, computes the error in the X direction as $F_x = S_x - I_x$. The instantaneous error signals $F_y$ and $F_x$ are applied in the form of control signals to the servo motors 13 and 23, so that the carriage 10 is moved to the desired position in the commonly known manner. The motion of the carriage takes place within the confinements of a fixed plane R.

In accordance with the present invention, the recording member 4 is not fixedly secured to the carriage 10. The recording member 4 is instead, also movable along X and Y directions with respect to the carriage 10. For the purpose of positioning the recording member 4 with servo motors, driving mechanisms $5_y$ and $5_x$ are provided. These include a permanent magnet 50, a ferromagnetic cross link 51 serving as a magnetic head, and an immersion coil $52_y$ and $52_x$ secured to a membrane or diaphragm member 53. This electrodynamic operating system is, for example, known in relation to loudspeakers. The membranes 53 carry, by means of a supporting member 54, the guide rods $55_y$ and $55_x$ for the support 40 of the recording member 4. By means of the guide rods $55_y$ and $55_x$, and the driving system $5_y$ and $5_x$, the support 4 is movable along the Y and X directions with respect to the carriage 10.

The error signals $F_y$ and $F_x$ from the sensing devices 16 and 26, respectively, are applied to the immersion coils $52_y$ and $52_x$. It is readily apparent that the driving mechanisms $5_y$ and $5_x$ for the support 40, may be made of substantially smaller mass, and therefore designed for greater accelerations, than the transport mechanisms for the carriage 10 and cross rod 20. Thus, the mechanisms for the support 40 respond rapidly to the error signals $F_y$ and $F_x$. Accordingly, while, at any instant of time, the carriage 10 may possess an appreciable error in its position, the support 40 for the recording member 4 is positioned rapidly in accordance with the error signals $F_y$ and $F_x$, so that it is positioned at the desired location with substantially no residual error.

The instantaneous positions of the support 40 and hence recording member 4, are denoted in the drawing by the symbols $i_y$ and $i_x$. These indicated values represent the Y and X coordinates of the support 40 with respect to a given reference point or origin of the carriage 10. Scales $56_y$ and $56_x$ are provided on the carriage for this purpose. The scales operate in conjunction with indicators $57_y$ and $57_x$ secured to the guide rods $55_y$ and $55_x$, respectively. In the plotter shown in FIG. 1, the indicating values or signals $i_y$ and $i_x$, are not utilized. They can, however, be transmitted to, for example, commonly known observation apparatus.

Figure 2:
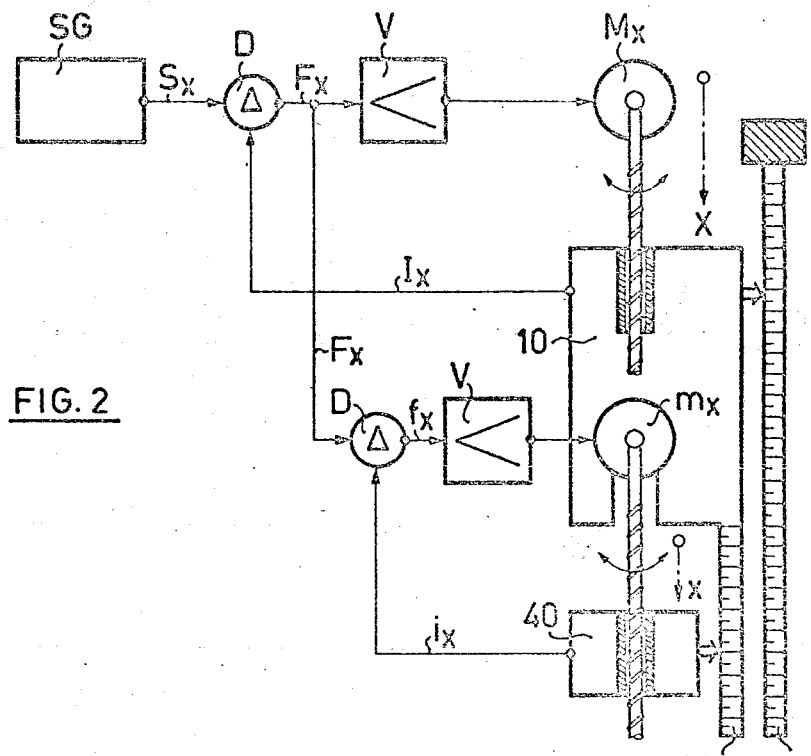
FIG. 2 is an electrical schematic diagram of one embodiment of the graphical plotter of FIG. 1, in which the servo drives for positioning the carriage and recording members have different inputs.

FIG. 2 illustrates schematically the manner in which the plotter is controlled in one coordinate, in accordance with the design of FIG. 1. A servo motor $M_x$ is provided for moving the carriage 10 over a relatively large distance X. Another motor $m_x$ is, on the other hand, provided for moving the support 40, for the recording member, over a relatively small distance $x$, in contrast to the carriage 10. The scale 34 is fixedly secured with respect to the entire plotter system, whereas the scale $56_x$ is secured to the carriage. The instantaneous positions $I_x$ and $i_x$ of the carriage and support 40, respectively, are derived from these scales. In addition, FIG. 2 includes an input device SG, two error sensors D, and two amplifiers V.

The difference $F_x = S_x - I_x$ controls, by way of the amplifier V, the servo motor $M_x$. At the same time, this difference $F_x$ serves as the input value for positioning the support 40 relative to the carriage 10. Thus, the difference $f_x = F_x - i_x$ controls the servo motor $m_x$ for the support 40.

Figure 3:
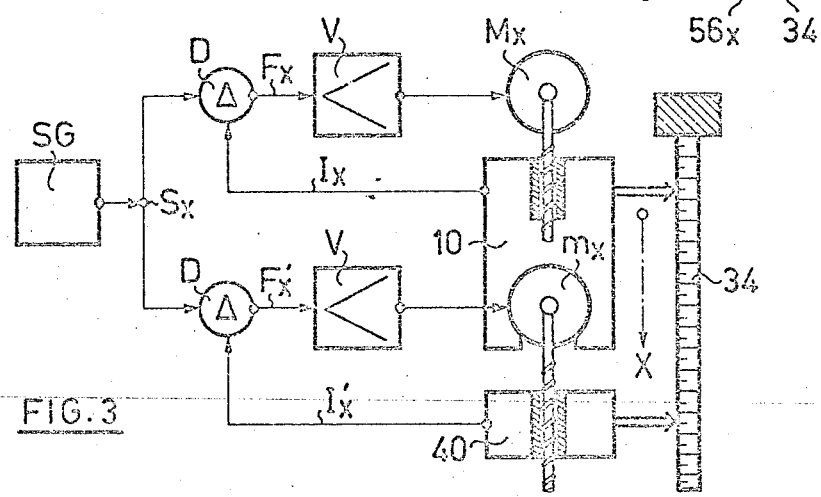
FIG. 3 is an electrical schematic diagram of a second embodiment of the graphical plotter of FIG. 1 in which the servo driving systems for driving the carriage member and recording member have the same input corresponding to the desired position of the carriage and recording member.

In accordance with the embodiment of FIG. 3, the instantaneous position $I_x$ of the carriage 10, and the instantaneous position $I'_x$ of the support 40, are both derived from the scale 34. The latter is fixedly secured with respect to the entire plotter system similar to the embodiment of FIG. 2. In the embodiment of FIG. 3, the main servo motor $M_x$ is driven in relation to the trror magnitude $F_x = S_x - I_x$. The servo motor $m_x$, on the other hand, is driven in accordance with the error magnitude $F'_x = S_x - I'_x$. The relatively slow-varying portions of the input signal $S_x$ are followed up by the motor $M_x$ in positioning the carriage 10. The more rapid varying portions of the input signal, on the other hand, are readily followed up by the motor $m_x$ which serves as an auxiliary or superpositioning member for the support 40. Thus, the motor $m_x$ compensates for any positional error associated in the carriage due to the motor $M_x$.

The principles of operation of the present invention are unaffected by any modifications or designs in which the control and sensing devices are of either analog or digital construction. Furthermore, it is apparent that the present invention may be used in conjunction with numerical control systems of either the increment or absolute type.

It will be understood that each of the elements described above, or two or more together, may also find a useful application in other types of plotter systems differing from the types described above.

I claim:

1. A graphical plotter comprising, in combination, a recording member movable along at least one coordinate axis of the plotting surface of said plotter; a carriage member movably supporting said recording member and also movable along said coordinate axis; a stationary reference member for movably supporting said carriage member; an auxiliary reference member secured to said carriage member and supporting said recording member so that the latter is movable along said coordinate axis with respect to said carriage member, said recording member being movable with respect to said carriage member over a substantially shorter distance than the substantially longer distance that said carriage member is movable with respect to said stationary member; membrane means mechanically secured to said recording member and displacing said recording member relative to said carriage member through the flexing property of said membrane; and electromagnetic actuating means mounted on said carriage and having a movable actuating member secured to said membrane means for displacing said membrane means and thereby displacing said recording member, said electromagnetic actuating means including an electromagnetic coil energized by an electrical current dependent upon the magnitude of displacement of said actuating member, said coil generating upon energization an electromagnetic field acting on said actuating member and physically displacing said actuating member in such a manner that the motion of said recording member with respect to said carriage member over said substantially shorter distance is substantially more rapid than the motion of said carriage member with respect to said stationary member over said substantially longer distance.

2. The graphical plotter as defined in claim 1, including carriage driving means for driving said carriage with respect to said stationary reference member; a first error sensing means providing a signal indicative of the difference between the instantaneous position of said carriage member and the desired position of the same, said first sensing means applying said signal to said carriage driving means for driving said carriage member to the desired position; and second error sensing means providing a second signal indicative of the difference between the instantaneous position of said recording member and said first error signal, said second signal being applied to said electromagnetic coil for moving said recording member to the desired position.

3. The graphical plotter as defined in claim 2, including amplifying means for amplifying said first and second error signals applied to said carriage driving means and said electromagnetic coil.

4. The graphical plotter as defined in claim 2, wherein said carriage driving means is servo motor means.

5. The graphical plotter as defined in claim 2, including input signal receiving means for receiving a signal indicative of said desired position and applying the same to said first error sensing means.

6. The graphical plotter as defined in claim 1, including carriage driving means for driving said carriage member with respect to said stationary reference member; a first error sensing means providing a first error signal indicative of the difference between the instantaneous position of said carriage member and the desired position of the same, said first error signal being applied to said carriage driving means for driving said carriage to the desired position; and second error sensing means providing a second error signal indicative of the difference between the instantaneous position of said recording member and said desired position, said second error signal being applied to said electromagnetic coil for moving said recording member to said desired position.

7. The graphical plotter as defined in claim 6, including amplifying means for amplifying said first and second error signals applied to said carriage driving means and said electromagnetic coil.

8. The graphical plotter as defined in claim 6, wherein said carriage driving means is servo motor means.

9. A graphical plotter as defined in claim 6 including input signal receiving means for receiving a signal indicative of said desired position and applying the same to said first and second error sensing means.

10. The graphical plotter as defined in claim 1, including orthogonally arranged driving and supporting members for driving said carriage member along a predetermined set of orthogonal axes.

11. The graphical plotter as defined in claim 1 including a membrane positioning member secured to said membrane and positioning said recording means in relation to the displacement of said membrane means, said recording member being movable with respect to said membrane positioning member along an axis perpendicular to the axis of displacement of said membrane means.

12. The graphical plotter as defined in claim 11 including sliding rod means secured to said membrane positioning member and in contact with said recording member so that said recording member is slidingly movable along said guide rod means and in a direction perpendicular to the direction of the displacement of said membrane means.

13. The graphical plotter as defined in claim 1 wherein said electromagnetic actuating means comprises further a ferromagnetic housing; a permanent magnet secured to said housing; and coil retaining means surrounding said permanent magnet and retaining said electromagnetic coil so that said coil retaining means is displaced in relation to the current applied to said coil, said coil retaining means being magnetically linked with said ferromagnetic housing through an air gap between said coil retaining means and said ferromagnetic housing, whereby said coil retaining means physically displaces said membrane means as a function of the current through said electromagnetic coil.

References Cited

UNITED STATES PATENTS 2,717,979  9/1955  Gardiner _____ 318—19
3,258,776  6/1966  Boyle et al. _____ 346—29

RICHARD B. WILKINSON, *Primary Examiner.*

JOSEPH W. HARTARY, *Assistant Examiner.*

U.S. Cl. X.R.

33—1; 318—19; 346—139